United States Patent [19]
Hosoe

[11] Patent Number: 5,566,657
[45] Date of Patent: Oct. 22, 1996

[54] ACCELERATION RESPONSIVE CONTROL SYSTEM AND METHOD FOR INTERNAL COMBUSTION ENGINE

[75] Inventor: Katsuharu Hosoe, Okazaki, Japan

[73] Assignee: Nippondenso Co., Ltd., Kariya, Japan

[21] Appl. No.: 569,607

[22] Filed: Dec. 8, 1995

[30] Foreign Application Priority Data

Dec. 12, 1994 [JP] Japan .................................. 6-307496
Sep. 11, 1995 [JP] Japan .................................. 7-232229

[51] Int. Cl.⁶ ............................................. F02P 5/15
[52] U.S. Cl. ............................ 123/418; 123/422; 440/87
[58] Field of Search .................................. 123/370, 418, 123/419, 422, 492; 440/87

[56] References Cited

U.S. PATENT DOCUMENTS

| | | | |
|---|---|---|---|
| 4,232,642 | 11/1980 | Yamaguchi et al. | 123/416 |
| 4,252,096 | 2/1981 | Kennedy | 123/370 |
| 4,493,303 | 1/1985 | Thompson et al. | 123/436 X |

FOREIGN PATENT DOCUMENTS 63-205462  8/1988  Japan .
5-505657  8/1993  Japan .

*Primary Examiner*—Tony M. Argenbright
*Attorney, Agent, or Firm*—Nixon & Vanderhye P.C.

[57] ABSTRACT

An ignition control for an internal combustion engine accurately determines current engine operational status (acceleration or deceleration) and controls optimally ignition timing. The exemplary system includes a microcomputer, drive circuits for driving ignition coils from outputs of the microcomputer, and a waveform shaping circuit for shaping signal pulses from a crank angle sensor before into the microcomputer. The microcomputer calculates changes in engine speed from wave-shaped signal pulses and determines acceleration rate relative to the maximum attainable acceleration from the speed changes. The microcomputer controls the ignition timing based on the determined acceleration rate. Thus, a complicated throttle link or throttle opening sensor is not necessitated to perform acceleration responsive engine control.

18 Claims, 6 Drawing Sheets

FIG.7(a) XACCF
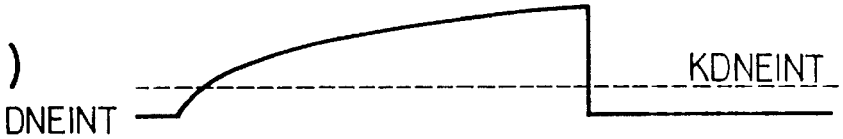
FIG.7(b) DNEINT — KDNEINT
FIG.7(c) NE
FIG.7(d) AESA
TIME →
FIG.8(a) XACCF
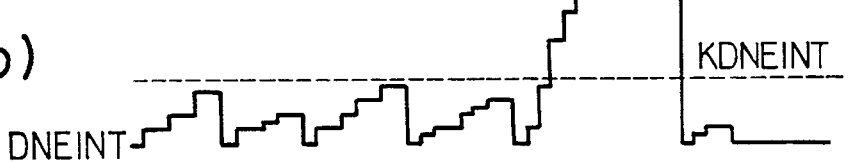
FIG.8(b) DNEINT — KDNEINT
FIG.8(c) NE
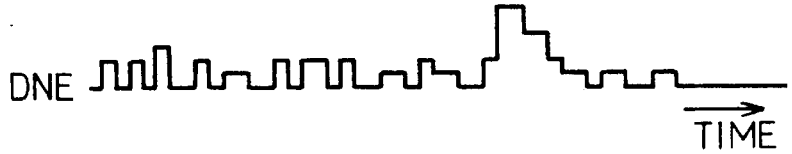
FIG.8(d) DNE
TIME →

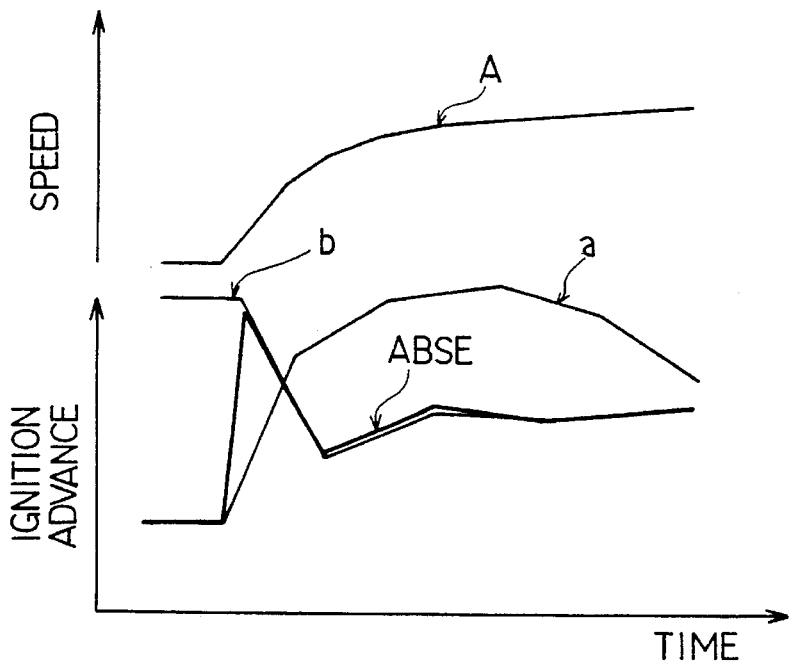
FIG. 9(a)
FIG. 9(b)
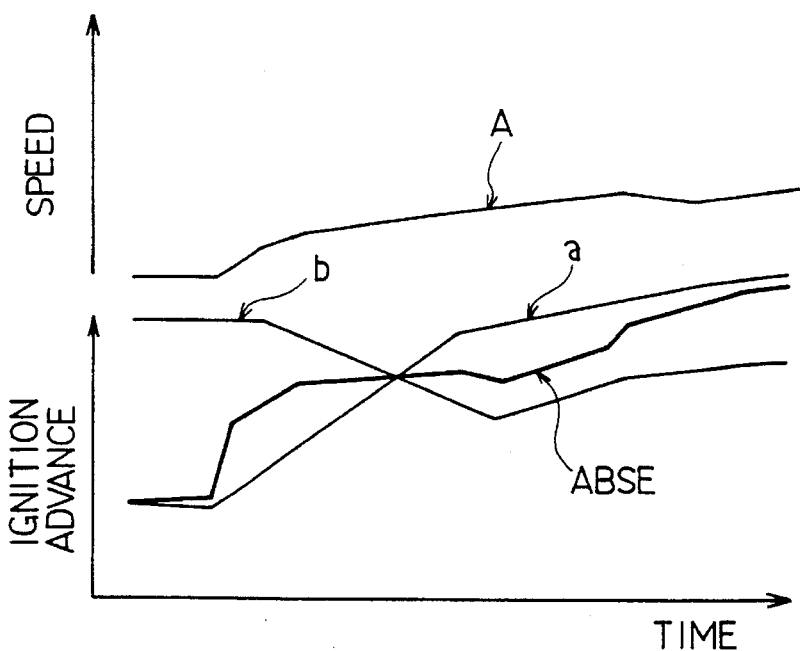
FIG. 10(a)
FIG. 10(b)

ACCELERATION RESPONSIVE CONTROL SYSTEM AND METHOD FOR INTERNAL COMBUSTION ENGINE

BACKGROUND OF THE INVENTION

1. Field of the Invention

The present invention relates to an acceleration responsive control system and method for an internal combustion engine. It discriminates between a non-accelerating mode and an accelerating mode of the engine and controls the engine in accordance with the determined operational status.

2. Description of Related Art

In an internal combustion engine (such as an outboard boat engine that needs to produce large torques in a very low speed range), ignition timing must be advanced in accordance with throttle demand for acceleration in order to produce a required torque level. A conventional internal combustion engine of this type typically employs: (a) a link operatively connected to a throttle valve so as to advance ignition timing in accordance with throttle valve operation, or (b) an electronic control with a throttle angle sensor detecting throttle valve angle and a microcomputer for processing the sensor signal to control ignition timing.

However, if such a throttle angle sensor or complicated link mechanism is utilized, the construction of the entire control system becomes considerably complicated and costly. In particular, the link mechanism requires a complicated adjustment function and thus causes various drawbacks (e.g., complicated maintenance).

If ignition timing is conventionally controlled in accordance with only throttle valve angle, ignition control is performed in a single manner regardless of whether the engine is accelerating or decelerating or in steady state, despite the fact that different ignition timings are required for accelerating and non-accelerating modes. Therefore, if such an ignition control is based on, for example, an assumed accelerating mode, it fails to perform optimal ignition control during a non-accelerating mode.

Japanese patent application laid-open publication No. SHO 63-205462 discloses a control that converts the amount of change in engine speed over a predetermined crank angle into the corresponding change in engine speed over a unit time to determine whether the engine is accelerating or decelerating and corrects the ignition timing accordingly.

However, since this control uses instantaneous change in engine speed over a predetermined small crank angle for determining engine operational status, the control appropriately performs when instantaneous engine speed fluctuation or vehicle vibration is substantially prevented, but may well provide the wrong determination when instantaneous engine speed fluctuations are great, for example, during idling.

BRIEF SUMMARY OF THE INVENTION

The present invention is intended to solve these problems. This invention provides an acceleration responsive control system and method for an internal combustion engine that precisely determines the current operational status of the engine based on its acceleration to properly control the engine.

According to the present invention, engine rotational speed is periodically measured and accelerating/non-accelerating mode of the engine is determined based on a change in the measured rotational speed. When it is in the accelerating mode, a rate of acceleration relative to the predetermined maximum acceleration is determined. Engine control such as ignition timing control is performed based on the determined acceleration rate. Thus, acceleration responsive engine control is performed without using a throttle link or throttle sensor.

BRIEF DESCRIPTION OF THE DRAWINGS

The foregoing and further objects, features and advantages of the present invention will become apparent from the following description of a preferred embodiment with reference to the accompanying drawings, wherein:

FIGS. 7(a) to 7(d) are timing charts of exemplary control according to the invention;

FIGS. 8(a) to 8(d) are timing charts of another example case of the control according to the invention;

FIGS. 9(a) and 9(b) are timing charts indicating the transition of ignition timing corresponding to engine speed obtained by a fully open throttle angle in an engine employing an acceleration responsive control system of the invention; and FIGS. 10(a) and 10(b) are timing charts indicating the transition of ignition timing corresponding to engine speed obtained by a half open throttle angle of an engine employing an acceleration responsive control system of the invention.

DETAILED DESCRIPTION OF A PREFERRED EMBODIMENT

A preferred embodiment of the invention will be described hereinafter with reference to the accompanying drawings.

Figure 1:
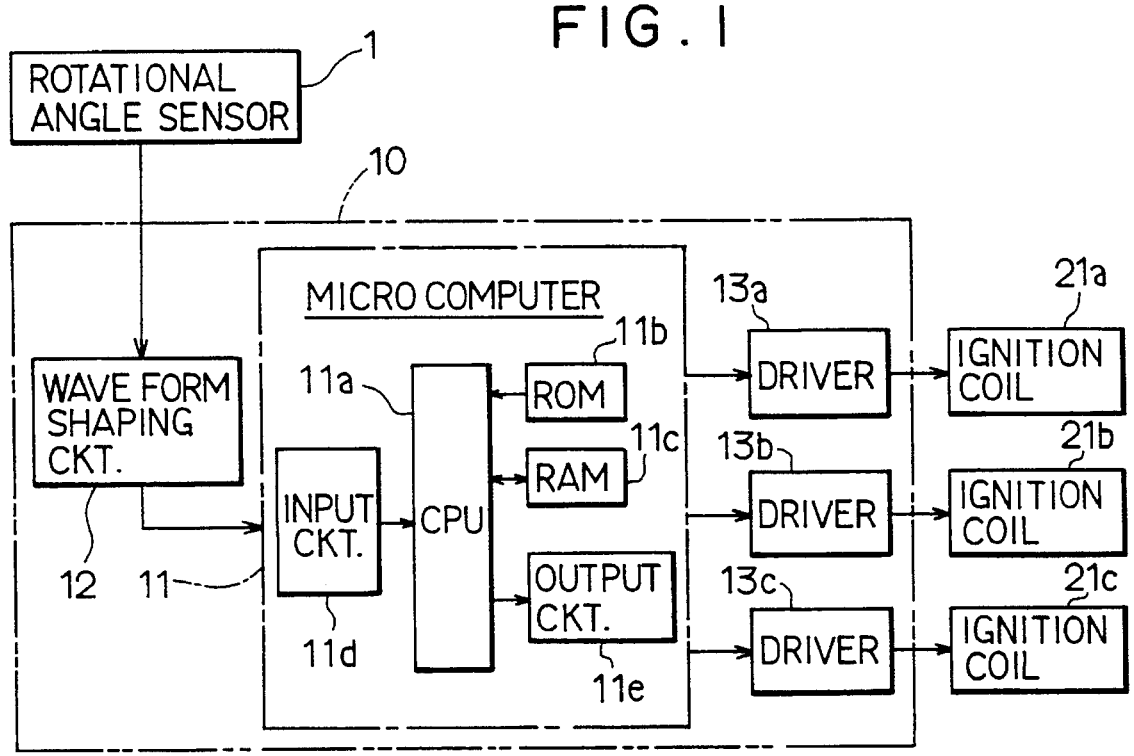
FIG. 1 is a schematic block diagram of an exemplary embodiment of an acceleration responsive control system for an internal combustion engine in accordance with the invention.

Referring to FIG. 1, an ECU (electronic control unit) 10 includes a one-chip microcomputer 11, drive circuits 13a, 13b, 13c (that drive ignition coils 21a, 21b, 21c in accordance with an ignition signal from the microcomputer 11), and a waveform shaping circuit 12 that shapes the waveform of signal pulses from a rotational angle sensor 1 for input to the microcomputer 11. The microcomputer 11 includes a CPU (central processing unit) 11a, a ROM 11b that stores various control programs for an internal combustion engine such as ignition control, a RAM 11c that temporarily stores various data, an input circuit 11d, and an output circuit 11e.

The rotational angle sensor 1 is disposed on a crankshaft or the like of the engine (not shown). The rotational angle sensor 1 operates synchronously with the rotation of the crankshaft. More specifically, the sensor 1 generates signal pulses at regular intervals corresponding to a predetermined crank angle, for example, 15φCA (crank angle), and omits generating a signal pulse at a predetermined crank position for indication of a cylinder currently concerned. This exemplary embodiment controls the ignition timing of a 2-stroke 3-cylinder internal combustion engine. The drive circuits 13a, 13b, 13c provided in the ECU 10 correspond to the ignition coils 21a, 21b, 21c for the respective cylinders.

Figure 2:
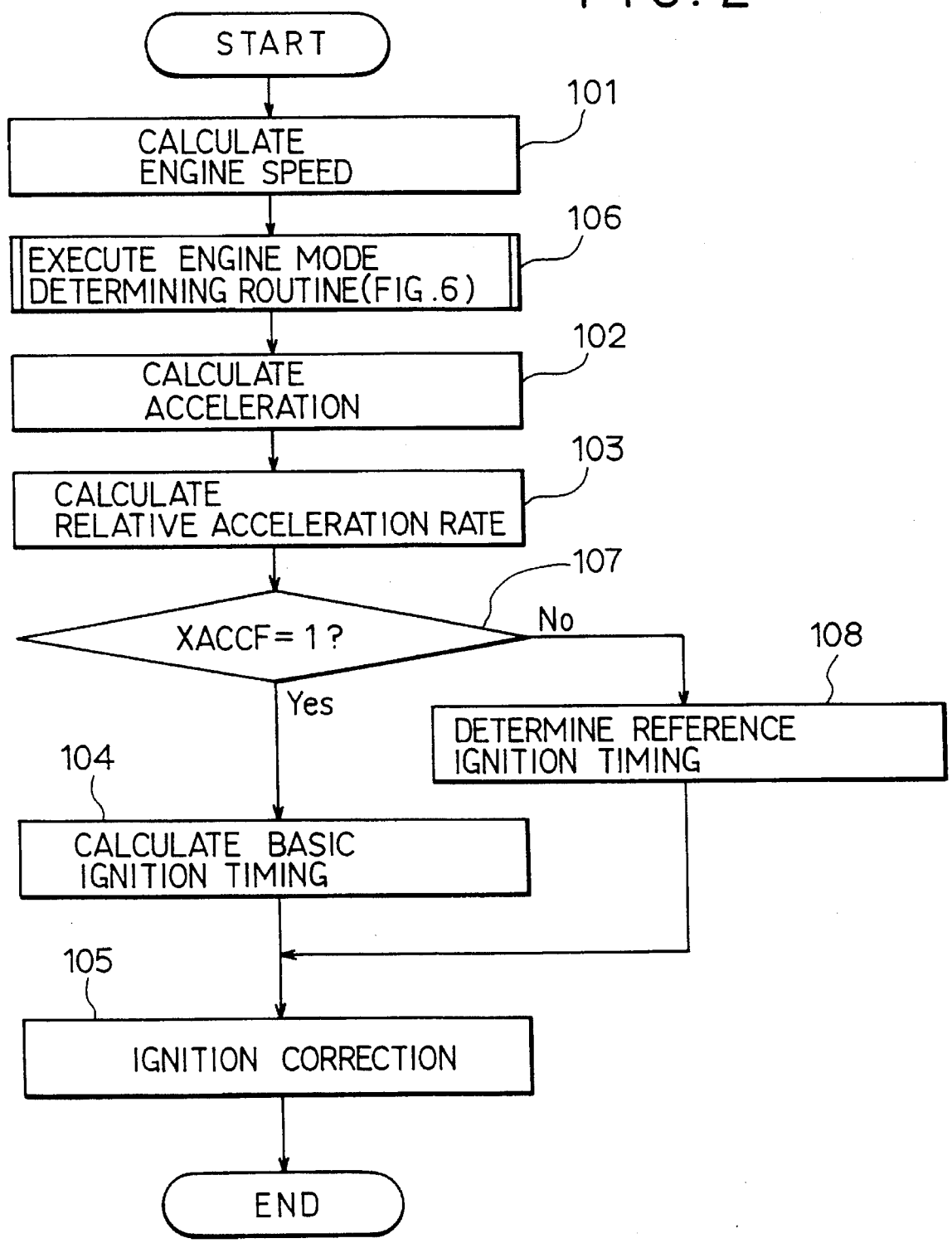
FIG. 2 is a flowchart illustrating the operation of a CPU used in the embodiment shown in FIG. 1.

The signal processing by the CPU 11a for cyclical ignition according to the exemplary embodiment will be described with reference to the exemplary control program flowchart of FIG. 2. The cyclical ignition control routine of FIG. 2 is repeatedly executed synchronously with the ignition cycle, for example, at a cycle of 120° CA in the exemplary embodiment of a 2-stroke 3-cylinder engine.

The CPU 11a calculates a change in engine speed (hereinafter, referred to as "engine speed change") in Step 101 by executing an engine speed calculating sub-routine. In this sub-routine, an engine speed NE is determined with reference to the interval of signal pulses from the rotational angle sensor 1. The engine speed NE is calculated on the basis of a time for rotation of a crank angle corresponding to a complete ignition cycle, that is, 120° CA for the 2-stroke 3-cylinder engine. It is optimal to calculate an engine speed NE based on the ignition cycle (120° CA time interval T). If the calculation of an engine speed NE is based on a shorter period (for example, 15° CA or 60° CA), the obtained engine speed value would be significantly affected by instantaneous engine speed fluctuations during the combustion cycle. Then, as in the prior art, subsequent calculation of engine speed would provide an apparent change that deviates significantly from the actual change, making it impossible to properly determine engine operational status.

After calculating the engine speed NE (=1/T) at step 101, the operation proceeds to Step 106 to determine whether the engine is in the accelerating mode. The CPU 11a executes an engine operation mode determining routine (illustrated in FIG. 6) to determine engine operational status, that is, whether accelerating or non-accelerating. The CPU 11a sets an engine operation mode flag XACCF to 1 or 0, depending on the engine operational status.

Then, step 102 calculates an acceleration value. The previously determined engine speed NE(i−1) is subtracted from the currently determined engine speed NE(i) to determine the increase (or decrease) in engine speed. If the calculation result (NE(i)−NE(i−1)) is negative, that is, the engine is decelerating, the resultant acceleration value is reset to 0.

Figure 3:
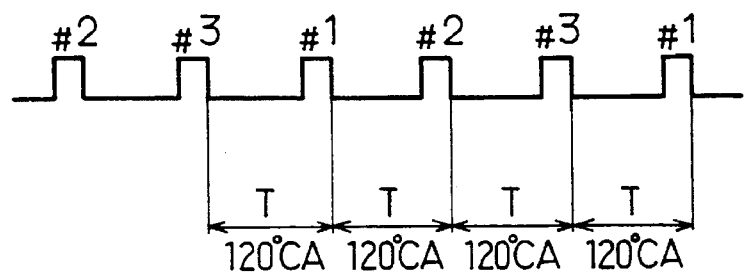
FIG. 3 illustrates signal pulses from a rotational angle sensor used in the embodiment of FIG. 1.

The calculation of acceleration based on signal pulses from rotational angle sensor 1 will now be described in more detail with reference to FIG. 3.

In a 2-stroke 3-cylinder engine, ignition is performed once for each cylinder during one rotation of the crankshaft (360° CA), which means that each individual ignition cycle is 120° CA. FIG. 3 indicates signal pulses generated by the rotational angle sensor 1 at TDC (top dead center) for each cylinder. The engine speed NE is calculated by measuring the time interval T between signal pulses, that is, the signal pulse cycle duration (speed being in inversely proportional to measured time interval). The engine speed change is also calculated on the basis of a change of the signal pulse cycle duration. An engine speed change over 360° CA (i.e., DNE360) used to determine a relative acceleration rate is calculated by the following equation (1):

$$DNE360=(NE(i-2)-NE(i-3)+ (NE(i-1)-NE(i-2))+(NE(i)-NE(i-1)) \quad (1)$$

As expressed by equation (1), engine speed change is determined as the difference between the current and previous engine speed values determined on the basis of each 120° CA ignition cycle, and then added to the total of the two preceding calculated 120° CA engine speed changes, to obtain a cumulative engine speed change over 360° CA as engine speed change DNE360. The crank angle of 360° CA is a suitable angle for determining an engine speed change in this exemplary embodiment since it includes a 2-stroke 3-cylinder engine performing ignition once for each cylinder during one rotation of the crank shaft.

Figure 1A:
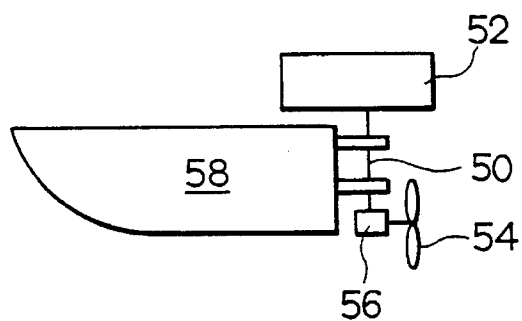
FIG. 1(a) is a schematic diagram of an outboard motor with the optimized ignition control of FIG. 1 installed on a boat hull.
Figure 4:
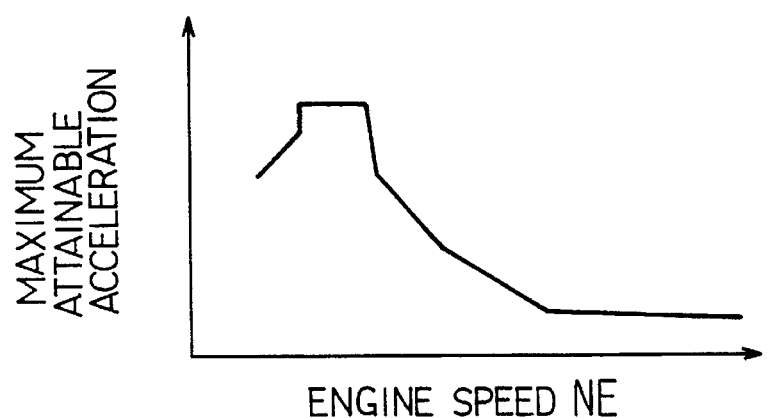
FIG. 4 is an engine characteristic diagram indicating the relationship between engine speed and maximum acceleration according to the embodiment of FIG. 1.

Step 103 in FIG. 2 determines a relative acceleration rate, e.g., with reference to a table corresponding to an acceleration characteristic diagram as shown in FIG. 4 that indicates the relationship between engine speed NE and maximum acceleration). The diagram of FIG. 4 indicates maximum accelerations that can be achieved by a given combination of, for example, an outboard engine 52 and a boat hull 58 where a rotation shaft 50 of the engine 52 is connected to a screw propeller 54 with a fixed rotational transmission ratio 56 as depicted in FIG. 1(a). Since the cumulative engine speed change DNE360 is determined as a moving average over 360° CA in this exemplary embodiment, the acceleration characteristic is provided in a table of maximum accelerations in 360° CA that depends on the engine speed, and stored in ROM 11b. The ROM 11b may be replaced by an electrically erasable and programmable medium such as an EEPROM.

The relative acceleration rate is determined by dividing the acceleration determined in Step 102 by the maximum acceleration value corresponding to the current engine speed on the basis of the acceleration characteristic as indicated in FIG. 4. Thus, the engine speed change DNE360 (acceleration) can be evaluated in terms of its ratio to the maximum acceleration that is achievable according to the known acceleration characteristic of the engine (e.g., from 0% to 100%).

Then, the operation proceeds to step 107, where the CPU 11a refers to the engine operation mode flag XACCF indicating the accelerating mode or the non-accelerating mode. If the engine operation mode flag XACCF is 0 (indicating the non-accelerating mode), the operation proceeds to step 108 to determine the reference ignition timing of the non-accelerating mode as the ignition timing. The reference ignition timing is an optimal known ignition timing for engine operation with zero acceleration. On the other hand, if the engine operation mode flag XACCF is 1 (indicating the accelerating mode), operation proceeds to step 104.

Figure 5:
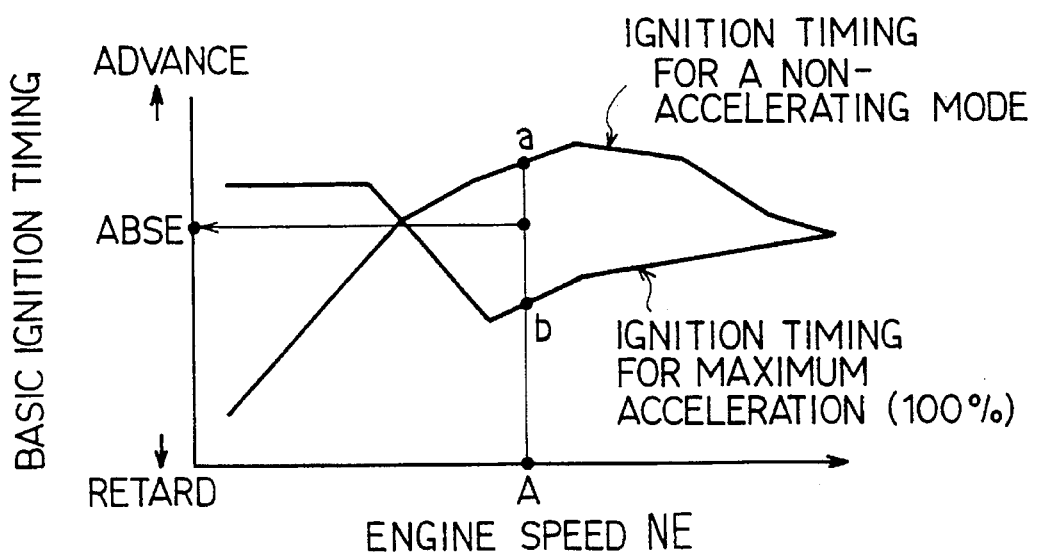
FIG. 5 is a diagram indicating the relationship between engine speed and ignition timing according to the embodiment of FIG. 1.

Step 104 calculates a basic ignition timing by using a table as indicated by the diagram shown in FIG. 5. Similar to the acceleration characteristic table (FIG. 4), the table used to calculate a basic ignition timing (FIG. 5) is stored beforehand in the ROM 11, which also may be replaced by an EEPROM or the like. The table (based on FIG. 5) provides two kinds of ignition timing: (a) optimal ignition timing for the non-accelerating mode (where the relative acceleration rate is 0 (acceleration=0)), and (b) optimal ignition timing for maximum (100%) acceleration operation (where the relative acceleration rate is 100% (acceleration=100%)), that is, when the throttle valve is fully open. The basic ignition timing ABSE is determined based on both kinds of ignition timing, current engine speed NE and the current relative acceleration rate by the following equation (2):

$$ABSE=(b-a) \times ACCR+a \qquad (2)$$

where a is the ignition timing for a non-accelerating mode (acceleration=0) when the engine speed is A; b is the ignition timing for maximum acceleration (acceleration=100%) when the engine speed is A; and ACCR is the relative acceleration rate (%) determined in step 103.

Then, step 105 executes various conventional control operations for correcting ignition timing, for example, knocking control or correction of rotational angle detected by the rotational angle sensor 1. To generate ignition signals at predetermined crank angles, step 105 executes angle-to-time conversion. Step 105 thus determines the final ignition timing, completing the routine of FIG. 2.

Figure 6:
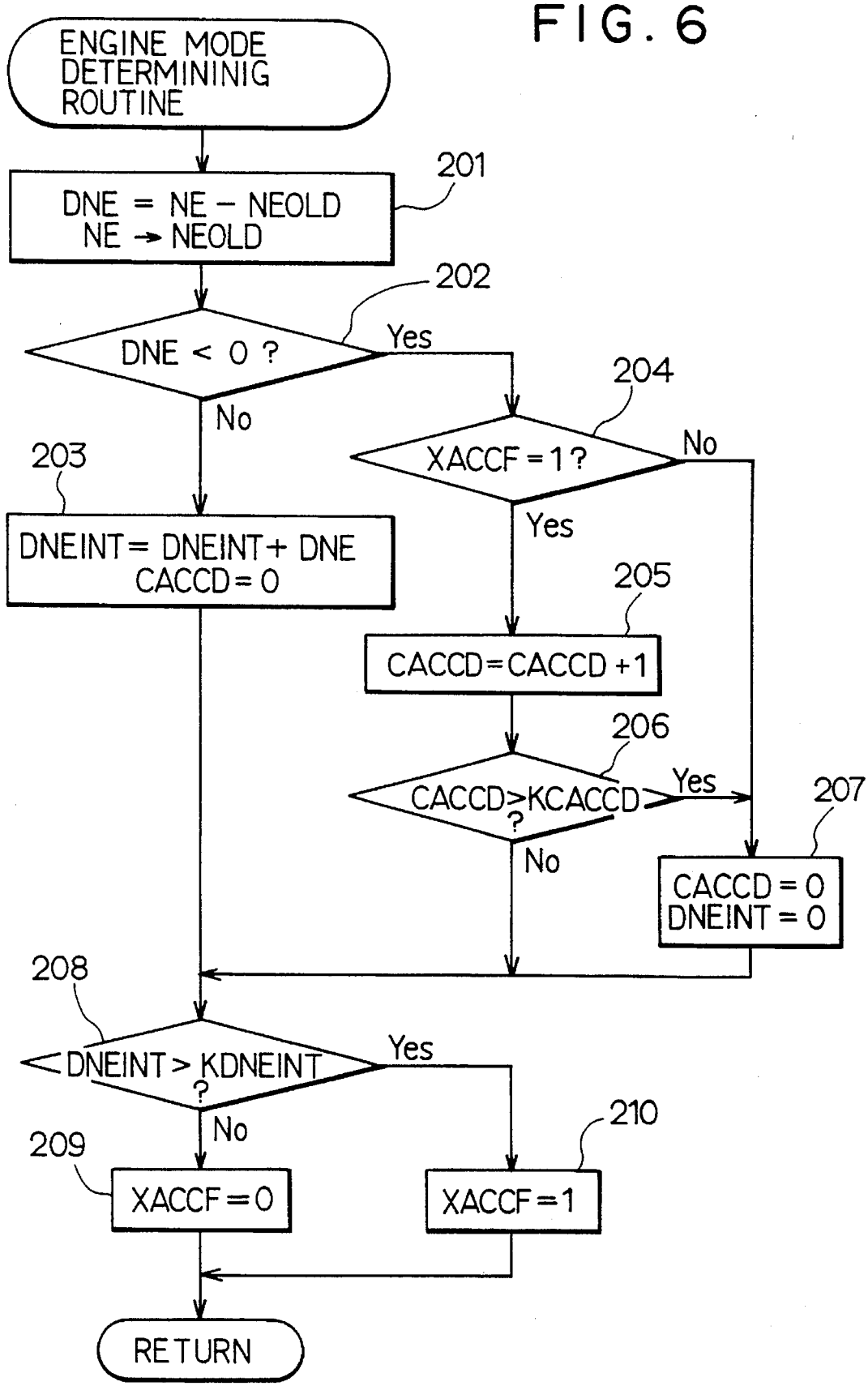
FIG. 6 is a flowchart illustrating an engine operation mode determining routine.

The engine operation mode determining routine executed in step 106 of FIG. 2 will now be described with reference to the flowchart of FIG. 6. Step 201 calculates an engine speed change DNE signal by the following equation:

$$DNE=NE-NEOLD=NE(i)-NE(i-1)$$

where NE is the currently determined engine speed; and NEOLD is the previously determined engine speed.

The processing of step 201 corresponds to an incremental change computing. After deriving the incremental change in engine speed, the currently determined engine speed NE is stored as NEOLD for the next calculation of an engine speed change. Step 202 determines whether the engine speed change DNE is less than zero, that is, whether the engine speed change is acceleration or not. If the change equals or exceeds 0 (accelerating change), the operation proceeds to step 203, where the change DNE is accumulated (integrated) to obtain an integrated change DNEINT as follows:

$$DNEINT=DNEINT+DNE$$

After calculation of the integrated engine speed change DNEINT, a deceleration counter CACCD is cleared. The deceleration counter CACCD counts the number of successive decelerating changes in the engine speed (the engine speed change DNE<0). The operation then proceeds to step 208.

If step 202 determines that the change DNE is less than zero (decelerating change), operation proceeds to step 204, where the engine operation mode flag XACCF is checked. If the engine operation mode flag XACCF is 1, that is, the previous change is acceleration and the current change is deceleration, the operation proceeds to step 205 to increment the counter CACCD. Step 206 determines whether the deceleration counter value CACCD (the number of successive decelerating changes in the engine speed) is greater than a predetermined number KCACCD. If the deceleration counter value CACCD is not greater than KCACCD, the operation proceeds to step 208. If the deceleration counter value CACCD is greater than KCACCD, the operation first proceeds to step 207, where the deceleration counter CACCD and the change integration DNEINT are cleared, followed by step 208.

If step 204 determines that the engine operation mode flag XACCA is zero, that is, the current and previous changes represent decelerations, the operation also proceeds first to step 207 to reset the deceleration counter value CACCD and the change integration DNEINT to zero, followed by step 208. The processing of Steps 202–207 corresponds to a reset means for resetting the integrated incremental engine speed change DNEINT when the engine speed change DNE continues to be negative (deceleration) for a predetermined length of time.

Step 208 compares the integrated incremental engine speed DNEINT with a predetermined value KDNEINT to determine whether the engine is in the accelerating mode. If DNEINT is greater than the predetermined value KDNEINT, step 208 determines that the engine is in the accelerating mode. Then, step 210 sets the engine operation mode flag XACCF to 1. On the other hand, if DNEINT is not greater than the predetermined value KDNEINT, step 208 determines that the engine is in the non-accelerating mode. Then, step 209 clears the engine operation mode flag XACCF to 0. The processing of steps 208–210 thus determines the engine operational status. The engine operation mode determining routine is thus completed.

Predetermined optimum signal values used in the engine operation mode determining routine (FIG. 6), that is, the deceleration counter limit value KCACCD and the accelerating mode criterion KDNEINT, should be determined empirically for individual engines. According to the exemplary embodiment, these values are predetermined as follows:

KCACCD=1
KDNEINT=300 rpm

Thus, if the integrated incremental engine speed change DNEINT exceeds 300 rpm, the exemplary embodiment determines that the engine is in an accelerating mode. If the incremental engine speed change DNE has been negative (deceleration) twice in succession (i.e., over a crank angle of 240° CA), the integrated incremental engine speed DNEINT is reset.

Exemplary cases where the above-described ignition control is performed will be described with reference to timing charts shown in FIGS. 7(a)–7(d) and 8(a)–8(d). FIGS. 7(a) and 8(a) indicate the engine operation mode flag XACCF; FIGS. 7(b) and 8(b) indicate the integrated engine speed change DNEINT; FIGS. 7(c) and 8(c) indicate the engine speed NE; FIG. 7(d) indicates the ignition timing AESA; and FIG. 8(d) indicates the engine speed change DNE.

Referring to FIGS. 7(a)–7(d), when the throttle valve is opened to accelerate the engine, engine speed NE starts to increase. Then, accelerating changes DNE in engine speed occur to increase the integrated incremental engine speed DNEINT. When DNEINT exceeds the accelerating mode criterion KDNEINT, the CPU 11a determines that acceleration has occurred, and sets the engine operation mode flag XACCF to 1. Thereby, the ignition timing AESA is switched from the ignition timing determined for a non-accelerating mode to ignition timing determined for an accelerating mode, that is, the ignition timing AESA is greatly advanced. While the accelerating mode continues, the engine operation mode flag XACCF continues to be 1 to continue the ignition timing control based on ignition timing determined for the accelerating mode. When the engine operation shifts from an accelerating mode to a non-accelerating mode, the engine operation mode flag XACCF is cleared to zero, switching from an ignition timing determined for an accelerating mode to ignition timing determined for a non-accelerating mode.

FIGS. 8(a)–8(d) illustrate in greater detail a case where the engine is accelerated from a non-accelerating mode (idling). During the non-accelerating mode (idling), the engine speed is relatively unstable, more specifically, successive accelerating changes occur. However, since the integrated incremental engine speed DNEINT is reset to zero when decelerating changes have successively occurred a predetermined number KCACCD of times (for example, twice), DNEINT does not exceed the accelerating mode criterion KDNEINT during such non-accelerating mode (idling).

However, when engine is accelerated from idling, great accelerating changes DNE successively occur. Thus, the integrated incremental engine speed DNEINT rapidly increases to exceed the accelerating mode criterion KDNEINT. The CPU 11a then determines that the engine has entered an accelerating mode and sets the engine operation mode flag XACCF to 1. Although accelerating changes remain dominant in a later stage of acceleration, a decelerating change may intermittently occur. However, since DNEINT is reset to zero only when decelerating changes have successively occurred a predetermined number (KCACCD) of times (for example, twice), the engine operation mode flag XACCF continues to be 1 (the accelerating mode). By this control, an occurrence of true intended acceleration can be immediately detected and such determination of accelerating mode will be held reliably until the acceleration is intended to end.

Since this exemplary embodiment discriminates between an accelerating mode and a non-accelerating mode by referring only to signal pulses that are generated at regular angular intervals by the crank angle sensor 1 synchronously with engine operation (without requiring a throttle sensor or a complicated link mechanism for advancing ignition timing during acceleration), the exemplary embodiment simplifies the system construction and reduces costs. In addition, since the exemplary embodiment switches between modes of ignition timing control in accordance with direct determination of the engine's operational status (that is, the accelerating mode or the non-accelerating mode), the control can be performed with optimal ignition timings determined separately for the accelerating mode and the non-accelerating mode. Thus, the exemplary embodiment can perform optimal ignition timing control regardless of engine operational status to improve engine performance.

An exemplary case where the above-described ignition control is performed will be described with reference to the timing charts shown in FIGS. 9(a), 9(b), 10(a), 10(b). In the figures, line A indicates the engine speed NE; line a indicates the ignition timing for zero acceleration (determined corresponding to engine speed on the basis of the diagram shown in FIG. 5); line b indicates ignition timing for 100% acceleration (determined corresponding to engine speed on the basis of the diagram shown in FIG. 5); and line ABSE indicates basic ignition timing (determined in step 104 of the flowchart of FIG. 2).

FIGS. 9(a), 9(b) indicate control operation when maximum acceleration is performed with the throttle valve being fully open. FIGS. 10(a), 10(b) indicate control operation when the engine is accelerated with the throttle valve open to about half the full extent. In the case of FIGS. 9(a), 9(b), where maximum acceleration is performed, changes in engine speed, that is, accelerations, accord with the predetermined acceleration characteristic and, therefore, the basic ignition timing becomes equal to the optimal ignition timing for maximum acceleration, that is, the ignition timing for the 100% acceleration.

In the case of FIGS. 10(a), 10(b), where the engine is accelerated with the throttle valve open to about half the full extent, engine speed changes, that is, accelerations, become less compared with the case of FIGS. 9(a), 9(b). The basic ignition timing ABSE becomes approximately the mean of ignition timing for zero acceleration and ignition timing for 100% acceleration, suitably adjusted to accumulate acceleration with the throttle valve half open.

As described above, the exemplary embodiment of acceleration responsive control system for an internal combustion engine includes an engine speed detector for detecting the engine speed of the engine, the engine speed detector including rotational angle sensor 11; an increment computer for cyclically calculating engine speed change DNE360 based on the output of the engine speed detector, the increment computer being realized by the CPU 11a provided in microcomputer 11; an acceleration characteristic store for storing an acceleration characteristic of the engine beforehand, the acceleration characteristic store including ROM 11a or the like; a relative acceleration rate computer for calculating a current-relative acceleration rate corresponding to engine speed change DNE360 calculated by the incremental computer on the basis of the acceleration characteristic stored in the acceleration characteristic store, the relative acceleration rate computer being realized by the CPU 11a of the microcomputer 11; a control characteristic value computer for calculating a control characteristic value of the engine in accordance with the relative acceleration rate calculated by the relative acceleration rate computer, the control characteristic value computer being realized by the CPU 11a of the microcomputer 11; and a controller for controlling the engine on the basis of the control characteristic value calculated by the control characteristic value computer, the controller being realized by the CPU 11a of the microcomputer 11.

The CPU 11a of the microcomputer 11 as the incremental computer cyclically calculates an engine speed change DNE360 in the engine speed NE detected by the rotational angle sensor 1. The CPU 11a as the relative acceleration rate computer calculates a current relative acceleration rate corresponding to the engine speed change DNE360. The CPU 11a as the control characteristic value computer calculates a control characteristic value of the engine in accordance with the relative acceleration rate. The CPU 11a as the controller controls the engine on the basis of the control characteristic value. Thus, the exemplary embodiment determines a current engine operational status on the basis of the acceleration characteristic of the engine, and performs control optimal for the current engine operational status.

In a preferred construction according to this exemplary embodiment, the incremental computer realized by the CPU 11a of the microcomputer 11 calculates an engine speed change DNE360 on the basis of a moving average of engine speed changes each over the 120° CA ignition cycles of the exemplary engine's three cylinders.

With this construction, the engine speed change DNE360 is calculated on the basis of a moving average of engine speed changes over each 120° CA ignition cycle of the engine corresponding to three cylinders by the CPU 11a as the incremental computer. Since the incremental engine speed determined in relation to a plurality of ignition cycles corresponding to the cylinders is substantially free from instantaneous fluctuations of engine operation, this construction effectively calculates relevant acceleration data with a high precision.

In another preferred construction, if an engine speed change is negative, the change value is reset to zero.

With this construction, if an engine speed change (NE(i)– NE(i–1)) for determining an engine speed change DNE360 is negative, that is, a decelerating change, the engine speed change is set to zero. Therefore, this construction substantially eliminates adverse effects of a temporary decelerating change that may be caused by, for example, pulsation of the engine during gradual acceleration.

In still another preferred construction, the control characteristic value computer realized by the CPU 11a of the microcomputer 11 computes a control characteristic value by interpolating between two kinds of values, that is, the control characteristic value corresponding to 100% relative acceleration rate and the control characteristic value corresponding to 0% relative acceleration rate, in accordance with the output of the relative acceleration rate computer realized by the CPU 11a.

With this construction, the CPU 11a as the control characteristic value computer performs interpolation based on the control characteristic value corresponding to 100% relative acceleration rate and the control characteristic value corresponding to 0% relative acceleration rate to determine a control characteristic value in accordance with the relative acceleration rate calculated by the CPU 11a as the relative acceleration rate computer. If a current relative acceleration rate is 100%, the control characteristic value is determined as a value predetermined optimally to the maximum acceleration mode where the engine is accelerated with the throttle valve being fully open (e.g., in a particular combination of engine and boat hull or the like). If a current relative acceleration rate is 0%, the control characteristic value is determined as a value predetermined optimally to engine operation with no engine speed change, that is, the constant speed mode (e.g., in a particular combination of engine and boat hull or the like). The control characteristic value in accordance with the current relative acceleration rate is determined by interpolation based on two kinds of predetermined control characteristic values. Thus, this construction provides a control characteristic value optimal to the current operating state of the engine.

In yet another preferred construction, the controller realized by the CPU 11a of microcomputer 11 controls ignition timing of the engine.

With this construction, CPU 11a as the controller controls ignition timing of the engine by using a control characteristic value calculated in accordance with the relative acceleration rate. Thus, this construction performs optimal ignition control continuously over the entire operation range from the constant speed operation to a maximum acceleration operation where the throttle valve is fully opened.

In a further preferred construction, the acceleration characteristic store provided in conjunction with microcomputer 11 includes an externally erasable and programmable storage medium that allows electrical rewriting of the acceleration characteristic.

With this construction, since acceleration characteristics can be electrically erased from or written in the store by external operation, the acceleration characteristic stored can be modified or replaced so as to determine a relative acceleration rate with a high precision and, therefore, provide a control characteristic optimal to a particular engine and/or engine environment.

Since the above-described exemplary embodiment discriminates whether the engine is in the accelerating mode by referring only to signal pulses that are generated at a regular angle interval by the crank angle sensor 1 synchronously with the engine operation, and optimally controls ignition timing in accordance with acceleration, the exemplary embodiment eliminates the need for a throttle sensor or a complicated link mechanism for advancing ignition timing during acceleration, thus simplifying the system construction and reducing costs. In addition, since the exemplary embodiment controls ignition timing in accordance with current relative acceleration rate, the control can be performed on the basis of optimal ignition timings determined for the accelerating mode and the non-accelerating mode. Thus, the exemplary embodiment can improve engine performance.

Although the exemplary embodiment uses signal pulses produced at 120° CA intervals from the rotational angle sensor 1, the invention is not limited to this. For example, the invention may use signal pulses corresponding to cylinder operations (for example, of the ignition cycle) and signal pulses for discriminating between the cylinders.

Although the exemplary embodiment uses two kinds of predetermined ignition timings (corresponding to 100% acceleration and 0% acceleration), the invention is not limited to this. For example, the invention may employ a two-dimensional ignition timing characteristic map based on engine speed and relative acceleration rate. Such an ignition timing characteristic map can be determined in generally the same manner as in a typical two-dimensional map based on engine speed and engine load (intake pressure or intake air flow).

The present invention is not limited to ignition timing control, but the determination of accelerating operation according to this invention can be applied to the fuel injection control, the intake air flow control, or other various controls for internal combustion engines. Besides, this invention is not limited to control of outboard internal combustion engines, but it can be applied to control any kind of internal combustion engine, such as inboard engines, automobile engines, or motorcycle engines. Furthermore, it should be understood that the invention can be applied not only to two-stroke engines but also to four-stroke engines regardless of the number of cylinders.

While the present invention has been described with reference to what is presently considered to be preferred exemplary embodiments thereof, it is to be understood that the invention is not limited to the disclosed exemplary embodiments. To the contrary, the invention is intended to cover various modifications and all equivalent arrangements included within the spirit and scope of the appended claims. The scope of the following claims is to be accorded the broadest interpretation so as to encompass all such modifications and equivalent structures and functions.

What is claimed is:

1. A control system for controlling output of an internal combustion engine, said system comprising:

rotation detecting means for detecting rotational movements that occur in the internal combustion engine;

relative acceleration rate computing means for calculating a relative acceleration rate based on a signal from the rotation detecting means, the relative acceleration rate indicating the proportion of current acceleration with respect to maximum acceleration achievable by the internal combustion engine;

control value computing means for computing a control value in accordance with the relative acceleration rate calculated by the relative acceleration rate computing means; and control means for controlling the internal combustion engine in accordance with the control value calculated by the control value computing means.

2. A control system according to claim 1, wherein the relative acceleration rate computing means comprises:

first computing means for computing a rotational speed of the internal combustion engine on the basis of the signal from the rotation detecting means;

second computing means for computing an acceleration of the engine on the basis of signals from the rotation detecting means;

acceleration data storing means for storing data indicating a maximum acceleration achievable by the internal combustion engine corresponding to the rotational speed computed by the first computing means; and third computing means for retrieving from the storing means a maximum acceleration corresponding to the rotational speed computed by the first computing means, and for computing the relative acceleration rate on the basis of the maximum acceleration retrieved from the acceleration data storing means and the acceleration computed by the second computing means.

3. A control system according to claim 2, wherein the second computing means determines a change between rotational speeds over a predetermined rotational angle as the acceleration.

4. A control system according to claim 3, wherein:

the second computing means performs computation of acceleration change a plurality of times during each complete engine cycle during which ignition is performed once for each cylinder of the internal combustion engine; and the second computing means comprises averaging means for computing a value corresponding to acceleration on the basis of the plurality of acceleration changes computed during each complete engine cycle.

5. A control system according to claim 4, wherein:

the internal combustion engine is a two-stroke three-cylinder engine, and the complete engine cycle is 360° crank angle (CA); and rotational speeds NE(i), NE(i–1), NE(i–2), NE(i–3) over every 120° CA are computed, and changes are computed as (NE(i)–NE(i–1)), (NE(i–1)–NE(i–2)), (NE(i–2)–NE(i–3)), and the averaging means determines a value corresponding to acceleration by totaling the changes (NE(i)–NE(i–1)), (NE(i–1)–NE(i–2)), (NE(i–2)–NE(i–3)).

6. A control system according to claim 1, wherein:

the control means includes ignition timing control means for shifting ignition timing of the internal combustion engine; and the control value computing means comprises:

ignition timing storing means for storing normal ignition timings for operation of the internal combustion engine where the relative acceleration rate is minimum and transitional-period ignition timings for operation of the internal combustion engine where the relative acceleration rate is maximum, the normal ignition timing and the transitional-period ignition timing corresponding to the rotational speed of the internal combustion engine; and interpolation computing means for performing interpolation by using as limit values a normal ignition timing and a transitional-period ignition timing that are retrieved from the storing means corresponding to the rotational speed, so as to determine an ignition timing in accordance with the computed relative acceleration value as the control value.

7. A control system according to claim 6, wherein:

the internal combustion engine is used as a power source for a boat; and a rotation shaft of the engine is connected to a screw propeller with a fixed rotational transmission ratio.

8. A control system according to claim 7, wherein:

the content stored in the acceleration data storing means and the content stored in the ignition timing storing means are stored in a storage that is erasable and programmable by external operation so that the contents can be changed in accordance with the characteristics of a boat in which the internal combustion engine is installed.

9. A control system according to claim 1, wherein:

the control means includes ignition timing control means for shifting ignition timing of the internal combustion engine; and the control value is ignition timing of the internal combustion engine.

10. A control system according to claim 9, wherein the control value computing means comprises:

storing means for storing normal ignition timings for operation of the internal combustion engine where the relative acceleration rate is minimum and transitional-period ignition timings for operation of the internal combustion engine where the relative acceleration rate is maximum, the normal ignition timing and the transitional-period ignition timing corresponding to the rotational speed of the internal combustion engine; and interpolation computing means for performing interpolation by using as limit values a normal ignition timing and a transitional-period ignition timing that are retrieved from the storing means corresponding to the rotational speed,, so as to determine an ignition timing in accordance with the computed relative acceleration value as the control value.

11. A control system according to claim 1, wherein:

the internal combustion engine is used as a power source for a vehicle; and a rotation shaft of the internal combustion engine is connected to a propeller shaft of the vehicle with a fixed rotational transmission ratio.

12. A control system according to claim 11, wherein:

the propeller shaft constitutes a screw propeller that acts on a fluid to produce a driving force.

13. A control system according to claim 12, wherein:

the vehicle is a boat.

14. A control system for controlling output of an internal combustion engine installed in a boat for rotatively driving a propeller, said system comprising:

an ignition coil;

a rotational angle sensor for detecting a rotational angle of the internal combustion engine and for outputting signal pulses; and an electronic control unit (ECU) for receiving the signal pulses from the rotational angle sensor and for generating an ignition signal to drive the ignition coil, whewein the ECU includes:

storing means for storing acceleration data indicating a maximum acceleration achievable by the internal combustion engine and ignition timing data indicating an ignition timing in accordance with a relative acceleration rate regarding rotation of the internal combustion engine;

acceleration computing means for computing data indicating rotational acceleration on the basis of the signal pulses from the rotational angle sensor;

relative acceleration rate computing means for computing a relative acceleration rate regarding rotation of the internal combustion engine on the basis of the acceleration computed by the acceleration computing means and the acceleration data stored in the storing means; and ignition timing determining means for determining an ignition timing of generating the ignition signal on the basis of the relative acceleration rate computed by the relative acceleration rate computing means and the ignition timing data stored in the storing means.

13

15. A control system according to claim 14, wherein:
the acceleration data stored in the storing means includes normal ignition timing data for operation of the internal combustion engine where the relative acceleration rate is small and transitional-period ignition timing data for operation of the internal combustion engine where the relative acceleration rate is large.

16. A control system according to claim 15, wherein:
the acceleration data corresponds to rotational speed of the engine.

17. An acceleration responsive control method for an internal combustion engine, said control method comprising:

generating at least one signal pulse at a predetermined rotational position during each combustion cycle of said engine;

generating an engine speed signal based on time duration of said signal pulse;

14 generating an engine acceleration signal based on an increase in successive two of said engine speed signal;

generating a relative acceleration signal as the proportion of said engine acceleration signal to a predetermined maximum engine acceleration for said engine speed signal currently detected; and controlling said engine in accordance with said relative acceleration signal.

18. An acceleration responsive control method according to claim 17, wherein said controlling step includes:

generating an interporated control signal having an interpolated value between predetermined control values for maximum engine acceleration and non-acceleration, said interpolated value being determined at least in part by said relative acceleration signal.

* * * * *